United States Patent Office 3,661,938
Patented May 9, 1972

3,661,938
PROCESS FOR THE PREPARATION OF GLYCIDYL ESTERS
William J. Heilman, Allison Park, Pa., assignor to Gulf Research & Development Company, Pittsburgh, Pa.
No Drawing. Filed Jan. 27, 1970, Ser. No. 6,280
Int. Cl. C07d 1/18
U.S. Cl. 260—348 A    14 Claims

ABSTRACT OF THE DISCLOSURE

A glycidyl ester, such as glycidyl methacrylate, is prepared by contacting an unsaturated fatty acid, such as methacrylic acid, with an alkali metal base, such as NaOH, a solution of an alkali metal hydroxide in a first reaction zone to form an alkali metal salt, such as sodium methacrylate, in the presence of a solvent which will azeotrope with water and which is free of epoxide groups. Substantially all of the water is removed from the first reaction zone by, for example, removing a water-solvent azeotrope. The alkali metal salt is then physically separated from the remaining solvent by filtration or centrifugation. The alkali metal salt is then reacted in a second reaction zone with dry epichlorohydrin under substantially anhydrous conditions to form the desired glycidyl ester.

---

This invention relates to a process for the preparation of glycidyl esters of unsaturated acids, and in particular to the preparation of glycidyl methacrylate.

Prior art processes for the preparation of glycidyl esters, such as the preparation of glycidyl methacrylate, by the reaction of epichlorohydrin with unsaturated acids or alkali metal salts thereof suffer from either or both of (1) poor yields of the glycidyl ester based on the unsaturated acid or alkali metal salt thereof or (2) poor desired ester product purity due to the formation of unwanted by-products. In addition, the prior art is contradictory in its teachings regarding the use of aqueous or anhydrous conditions in the preparation of the esters. For example, United States Pat. No. 2,893,875 teaches the use of aqueous media to prepare fatty acid-epichlorohydrin adducts. Similarly, United States Pat. No. 2,524,432 teaches the esterification of an epoxy compound such as epichlorohydrin with an alpha,beta-ethylenically unsaturated monocarboxylic acid or the ester forming derivative of such acid in the presence of a water medium. Contrariwise, United States Pat. No. 2,537,981 to Edwards teaches the preparation of an alkali metal salt of a fatty acid which is then filtered and dried before reaction with the epichlorohydrin. All of the working examples in the Edwards patent utilize the dry salt for reaction with the epichlorohydrin.

A more recently issued Japanese Pat. No. 40/7887 teaches a three step process for the preparation of glycidyl methacrylate. Initially, methacrylic acid is neutralized in a solvent and in the presence of a polymerization preventative agent, such as phenyl (alpha) naphthyl amine. Secondly, the product is dehydrated by azeotropic distillation. Epichlorohydrin is then added together with a known catalyst to promote the reaction between the formed salt and the epichlorohydrin. The Japanese patent teaches it has been customary to treat the unsaturated organic acid with an aqueous alkali solution, thereby converting it into an unsaturated organic acid salt, followed by the concentration of the same to make a gruel-like substance which is dried under a reduced pressure for a long period of time before it is reacted with epichlorohydrin.

French Pat. No. 1,446,544 defines a process for the preparation of esters by the reaction of salts (soaps) of carboxylic acids with epoxy-halogeno-alkanes, the process being characterized in that these salts are made to react in the form of suspensions in organic solvents; which have been obtained by progressively adding aqueous solutions of hydroxides to solutions of these carboxylic acids in organic solvents, water having been driven off by distillation.

Thus, it appears that investigations have been made into single and multi-step processes, either aqueous or partially non-aqueous systems for the preparation of glycidyl esters. Despite the various processes and approaches which have been tried, problems are still prevalent as noted above. The yields of glycidyl methacrylate are reduced by the formation of by-products such as a chlorohydrin ester

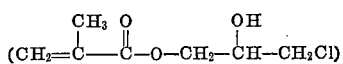

The purity of the desired glycidyl methacrylate is reduced by the presence of this chlorohydrin ester and by the presence of an undesired by-product 1,3-dichloropropanol-2. The process of this invention results in increased yields of glycidyl methacrylate based on the alkali metal acid salt and in improved purity of the glycidyl methacrylate.

In view of the conflicting and divergent methods of approach taken by various persons supposedly skilled in the art to the basic problem of preparing the glycidyl esters in high yield, it was surprising to discover that glycidyl esters can be made in very high yields, in many instances over 90 percent of theoretical, by a careful control of process parameters not heretofore taught and appreciated as being critical in achieving the desired results.

In accordance with the invention, a glycidyl ester is prepared by a process which comprises:

contacting an unsaturated fatty acid having from three to 20 carbon atoms with an alkali metal base to form an alkali metal salt of said acid and water in a first reaction zone in the presence of an epoxide-free solvent which will azeotrope with water; and removing substantially all of the water from said first reaction zone while maintaining the formed alkali metal salt in suspension in said solvent;

separating said alkali metal salt from said solvent by physical means; and reacting said separated alkali metal salt without drying in a second reaction zone with epichlorohydrin under substantially anhydrous conditions to form the desired glycidyl ester.

The glycidyl esters of the present invention are glycidyl esters of unsaturated monocarboxylic aliphatic organic acids having from three to 20 carbon atoms per molecule, i.e., fatty acids having from three to 20 carbon atoms. These glycidyl esters may be represented by the general Formula I below:

FORMULA I

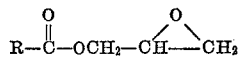

wherein R is an unsaturated unsubstituted alkyl radical having from two to 19 carbon atoms.

The glycidyl esters of the unsaturated fatty acids of the present invention are obtained by reaction of an alkali metal salt of an unsaturated fatty acid, for example, methacrylic acid, with epichlorohydrin.

The suitable unsaturated fatty acids comprise the acids represented by the general Formula II below:

FORMULA II $$R-\overset{O}{\underset{\|}{C}}-OH$$

where R is an unsaturated unsubstituted alkyl radical having from two to 19 carbon atoms, preferably from two to 10 carbon atoms, and most preferably having from two to four carbon atoms. By an "unsaturated unsubstituted alkyl radical" is meant an alkyl radical or group containing only carbon and hydrogen and having one or two, preferably one, olefinic double bond.

Examples of suitable unsaturated fatty acids coming within the above formula include acrylic; methacrylic; allylacetic; vinyl acetic; crotonic; isocrotonic; tiglic; angelic; senecioic; hexenic acids ($C_5H_9COOH$); hypogeic acid ($C_{15}H_{29}COOH$); oleic; elaidic acid ($C_{17}H_{33}COOH$); linoleic acid ($C_{18}H_{32}O_2$); palmitoleic acid ($C_{16}H_{30}O_2$); myristoleic acid ($C_{14}H_{26}O_2$); and linolenic acid ($C_{18}H_{30}O_2$)

The above-described unsaturated fatty acids are reacted in a first reaction zone or stage with an alkali metal base. By an "alkali metal base" is meant an alkali metal hydroxide or carbonate which will enter into a neutralization reaction with an acid to form the salt of the acid plus water. The base, if carbonate, can be used in the solid form but is preferably in solution in an alcohol or water. The alkali metal hydroxides are used in solution only. By an "alkali metal" is meant sodium, potassium, lithium and cesium.

The preferred bases are the alkali metal hydroxides which can be represented by Formula III below.

FORMULA III

MOH where M represents any alkali metal selected from the group consisting of sodium, potassium, lithium and cesium. It has been found that solid dry alkali metal hydroxides do not work in the process of this invention even when ground up in fine powdered form. Apparently the solid alkali metal hydroxide is not soluble in the unsaturated fatty acid, and thus the desired reaction does not occur. It is necessary, therefore, to employ a solution of the alkali metal hydroxide in a suitable solvent, such as water, or a low boiling alcohol, such as methanol, which boils lower than the solvent employed and can suitably be removed from the reaction product before the epichlorohydrin is added in the second stage. Water is the preferred solvent for the alkali metal hydroxide. The amount of water necessary to form an aqueous solution is not critical, but sufficient water or other solubilizing agent should be employed to keep the alkali metal hydroxide in solution. Commercially available 50 to 70 percent aqueous solutions of alkali metal hydroxides, such as sodium hydroxide and potassium hydroxide, can suitably be employed and are, of course, the most desired since they are easily obtained.

Theoretically, one mole of the alkali metal base is required per mole of the unsaturated fatty acid in order to produce one mole of the alkali metal carboxylate. For economic reasons, the molar ratio of the alkali metal to the unsaturated monocarboxylic acid should be about 1:1. It is preferably between 0.95:1 and 1.5:1 and is more preferably between 0.98:1 and 1.2:1. Higher amounts of alkali metal hydroxide, i.e. in molar ratios up to 5:1, can suitably be employed but offer little advantage. Lower amounts of alkali metal hydroxide, i.e., in molar ratios below about 0.8:1, can be employed but are not preferred.

The reaction in the first reaction zone or stage is a simple neutralization reaction with the formation of a salt and water in accordance with the following equation:

$$R-\overset{O}{\underset{\|}{C}}-OH + MOH \xrightarrow{solvent} R-\overset{O}{\underset{\|}{C}}-OM + H_2O$$

where M and R have the significance defined above. The $$R-\overset{O}{\underset{\|}{C}}-OM$$

salt is a solid which precipitates in finely divided form and can be suspended by suitable agitation in the solvent. As noted above, the solvent may be any epoxide-free liquid material which will form an azeotrope with water and which, of course, is substantially unreactive with the components of the reaction mixture under the conditions of the reaction. The solvent must also be inert with respect to epichlorohydrin since epichlorohydrin is employed as the charge stock in the second stage of the reaction. By "inert" is meant that it will not chemically react with the components of the reaction mixture or epichlorhydrin under the conditions of the reaction. Epichlorohydrin is a liquid material which forms an azeotrope with water but is not a suitable solvent for the first stage reaction since the epoxide group tends to interact with the water, at least in part, to form unwanted side reaction products. It has been found that inert solvents can be employed as a reaction medium in the formation of the alkali metal salts and the same solvents can be used to aid in the removal of water by azeotropic distillation while maintaining the salts in a slurry suspension.

Suitable solvents include benzene, toluene and other low boiling alkylated aromatic hydrocarbons; halogenated hydrocarbons such as carbon tetrachloride and 1,2-dichloroethane; 1,2-dichloropropane; trichloroethylene; and 2-chloropropane. A more detailed list of suitable solvents will be given below. Any chemist with ordinary skill in the art would know which materials azeotrope with water and which do not adversely react in either step of the process of this invention. The more preferred solvents are those which form azeotropes having the larger weight percents of water so that lesser amounts of the solvent-water azeotrope need to be removed overhead in a distillation zone to substantially dry the reaction mixture. It is also preferred to employ those solvents which, although they form an azeotrope with water, are also substantially insoluble in water to allow the solvent removed overhead as an azeotrope to be physically separated from the water and recycled to the reaction zone. It is further preferred that the solvent not boil too close to epichlorohydrin from which it is preferably distilled after the formation of the desired glycidyl esters.

The more preferred solvents can be represented by the general Formula IV below:

FORMULA IV

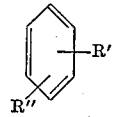

where R' and R" are the same or different and are selected from the class consisting of hydrogen, alkyl groups having from one to two carbon atoms, chlorine, bromine and iodine.

Another preferred group of solvents can be represented by the general Formula V below:

FORMULA V $$R'''-\underset{\underset{R'''}{|}}{\overset{\overset{X}{|}}{C}}-\underset{\underset{R'''}{|}}{\overset{\overset{X'}{|}}{C}}-H$$

where $x$ and $x'$ can be the same or different and are selected from the group consisting of chlorine, bromine and iodine and R''' is selected from the group consisting of hydrogen, alkyl radicals having from one to two carbon atoms, chlorine, bromine or iodine.

A sufficient amount of the solvent should be employed to allow the solvent to serve its function of maintaining the alkali metal salt of the unsaturated fatty acid in suspension before, during and after removal of the water from the reaction zone. The molar ratio of the solvent to the unsaturated fatty acid in the first step is greater than 1:1, and is usually on the order of 5:1. Much greater amounts of solvent to acid, for example on the order of 10:1 to 100:1 or greater, e.g. 1000:1 or higher, can also, of course, be employed.

A list of suitable solvents which can be employed and which is not meant to be limiting in any way includes, for example:

benzene;
chloroform;
1,2-dichloroethane;
1,2-dichloropropane;
1-chlorobutane;
1,2-dimethoxyethane;
toluene;
cis,1,2-dichloroethylene;
bromoethane;
1-chloropropane;
1-chloro-2-methylpropane;
decane;
xylene;
1,2-dichloroethylene;
iodoethane;
2-chloropropane;
1-iodo-2-methylpropane;
chlorobenzene;
carbon tetrachloride;
trans-1,2-dichloroethylene;
3-iodopropene;
1-chloro-2-methyl-1-propene;
isobutylnitrate;
1,1-dimethoxyethane The alkali metal base reacts very quickly with the unsaturated fatty acid to produce the desired alkali metal carboxylic acid salt even at low temperatures. The exact temperature to employ will depend on the activity of the unsaturated fatty acid and alkali metal base. Suitable temperatures include those between 0° C. and 200° C., with temperatures between 20° C. and 100° C. being normally satisfactory and temperatures between 20° C. and 40° C. being preferred.

The upper reaction temperature in the first stage is limited by the boiling point of the solvent unless increased pressures are employed. Increased pressures can be employed if desired but show no advantage over atmospheric operation. The upper temperature is therefore limited by that temperature wherein the solvent vaporizes since it is necessary to maintain the solvent in the liquid phase. It is noted, however, that the reaction of the alkali metal base with the unsaturated fatty acid is an exothermic reaction and suitable means, such as cooling coils, can be added to control the temperature of the first stage of the reaction to the desired level. The amount of cooling required will, of course, be proportional to the rate of addition, for example, of the alkali metal hydroxide solution to the mixture of solvent and unsaturated fatty acids. The reaction pressure is not critical but must be sufficient to maintain the unsaturated fatty acid and solvent in the liquid phase. Atmospheric pressure is generally preferred for reasons of economy, however, pressures as low as 0 or as high as 100 p.s.i.g. can be employed. It may also be desirable to remove the water of reaction substantially as quickly as it is formed as an azeotrope with the above-defined solvent. Atmospheric pressure or below is preferred for this type of operation.

The manner of admixing the unsaturated fatty acid, alkali metal base and solvent is not critical. Usually the solvent and acid are admixed and the alkali metal base, in solution, is added dropwise continuously through the course of the reaction or in incremental portions or slugs during the reaction. It is not preferred to add all of the alkali metal base initially due to the heat of reaction developed which, as noted above, is difficult to control.

The reaction time for the first stage in the reaction is not critical and will vary depending on the exact temperature employed, but should be long enough to allow for the formation of the desired alkali metal acid salt. Reaction is very fast, however, even at the low temperatures of 0° C., and reaction times are generally on the order of one minute to 60 minutes, and more usually between five minutes and 15 minutes. If desired, a polymerization inhibitor, such as an amine, substituted phenol or quinone, can be added to the reaction mixture to inhibit the polymerization of the acid or solvent. Sufficient mixing should be provided to insure adequate and uniform temperature control and contacting throughout the reaction zone.

After the formation of the desired alkali metal acid salt, the water is removed from the reaction mixture by any suitable means. One suitable means is to increase the temperature of the admixture of the alkali metal acid salt, solvent and water to allow for the removal of a water-solvent azeotrope at atmospheric pressure or under a vacuum. This temperature is usually between 95° and 115° C. at atmospheric pressure. The water-solvent azeotrope can be treated in any suitable manner to recover the solvent and return it to the reaction zone if desired. As noted above, it is preferred that the solvent employed be substantially insoluble with the water so that it can be physically and easily separated from its azeotrope with water by decantation. The water of reaction can be removed substantially as quickly as it is formed, if desired. By operating in this manner, the reaction time in the first stage is reduced in accordance with the laws of mass action.

When the reaction mixture from the first stage is substantially dry, which is shown by any suitable means, such as by the fact that only substantially pure solvent is removed overhead, i.e., no water is observed to form as a separate phase from the overhead product upon standing, the alkali metal salt formed in the first stage is then separated from the remaining reaction solvent by any suitable physical means, such as filtration or centrifugation. It has been found that it is not suitable to simply remove the alkali metal salt as formed from the first stage reaction product without initially azeotropically removing the water. If azeotropic distillation of the water is not initially performed, the yield of the desired glycidyl ester in step two is for some reason considerably less than by following the critical procedure as set forth herein, namely to first remove the water from the reaction product of step one by, for example, azeotropic distillation, and only then to physically separate the alkali metal salt from the remaining reaction solvent. Further, it has been found that azeotropic distillation of the water followed by reaction of the salt in suspension without the critical step of filtration as taught herein results in reduced yields of the desired glycidyl esters.

After the physical separation of the alkali metal salt from the reaction solvent, the salt is preferably washed several times with portions of a dry solvent, preferably dry epichlorohydrin.

The separated salt is then added to a second reaction zone for reaction with epichlorohydrin to form the desired glycidyl ester.

The epichlorohydrin should be as scrupulously dry as possible. To this end, it is preferable to not only redistill commercially available epichlorohydrin just prior to use in the subject reaction, but to contact the epichlorohydrin with a suitable drying agent such as natural or synthetic zeolites (molecular sieves) just prior to use to further reduce the water content, preferably to a water content of less than 10 p.p.m.

The reaction temperature in the second stage is suitably maintained from about 50° to about 100° C. and is preferably maintained from about 60° to 80° C. with the optimum temperature being about 70° C. The use of reaction temperatures above 100° C. is undesirable because a by-product is formed, the exact nature of which is unknown, but it is known that the by-product interferes with the separation of the epichlorohydrin from the desired glycidyl ester.

The reaction pressure in the second stage is not critical but should be such as to maintain the reactants in the liquid phase. Atmospheric pressure is preferred, but pressures within the range given for stage one above can also be successfully employed here.

The reaction between the alkali metal acid salt and the epichlorohydrin to form the desired glycidyl ester can be promoted thermally within the temperature range defined above. The thermal reaction is slow and is preferably promoted by the presence of a catalyst, the exact nature of which is not the essence of this invention. Thus, any catalytic material well known in the art can be employed to promote the reaction between epichlorohydrin and the alkali metal acid salt.

One class of catalytic materials which are preferred to promote the reaction of the alkali metal acid salt with epichlorohydrin are the quaternary ammonium halides. Preferred quaternary ammonium halides are represented by the general Formula VI below:

FORMULA VI

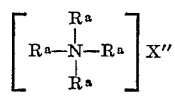

where N is nitrogen; X" is chlorine or bromine; and R$^a$ is an unsubstituted hydrocarbon radical having between one and 12 carbon atoms, such as an alkyl, cycloalkyl, aryl, alkaryl, aralkyl and the like radicals.

Examples of suitable salts include, among others:

benzyltrimethylammonium chloride;
benzyltrimethylammonium bromide;
cyclohexyltrimethylammonium bromide;
phenoltrioctylammonium bromide;
tetrabutylammonium chloride;
tetraoctylammonium chloride; and
tetramethylammonium bromide.

Other suitable catalytic materials include the tertiary amines, such as are defined in U.S. Pat. No. 3,075,999.

The amount of the catalyst to be used in the process may vary over a considerable range depending on the type of catalyst employed. Generally, the quaternary ammonium halides will be employed in amounts varying from about 0.01 percent to five percent by weight to the alkali metal acid salt reactant. Preferred amounts vary from about 0.01 percent to about three percent by weight of the alkali metal acid salt.

The time necessary to effectuate the reaction between the alkali metal acid salt and the epichlorohydrin can vary between about ten minutes and ten hours or more. The usual reaction times when a catalyst is employed are between one and eight hours, preferably between two and six hours, with the longer reaction times being required at the lower temperatures and with the lower catalyst concentrations.

The alkali metal acid salt and the epichlorohydrin react to form the desired glycidyl ester in accordance with the following equation:

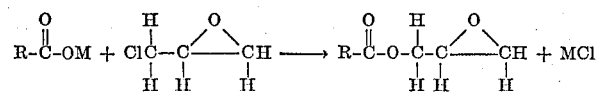

where R and M have the significance given above. Stoichiometrically, one mole of epichlorohydrin is required for each mole of the alkali metal salt. In practice, however, much higher molar ratios of epichlorohydrin to the alkali metal acid salt are employed as the epichlorohydrin also serves as a solvent for the second stage reaction. Thus, the molar ratio of epichlorohydrin to salt is preferably from about 8:1 to 16:1 but can be as low as 3:1 or as high as 100:1 or more.

After the formation of the desired glycidyl ester, the total reaction product is treated to separate the unreacted epicholorhydrin from the glycidyl ester reaction product. Any suitable means can be used to effectuate the separation, such as distillation. It has been found that if the content of chlorohydrin ester

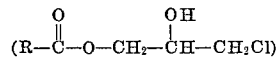

by-product is above about six weight percent of the reaction product, that conventional distillation is not recommended due to high losses of glycidyl ester during distillation. It appears the glycidyl ester in some manner polymerizes during fractionation. Distillation under high vacuum and in the presence of polymerization inhibitors such as those mentioned above still results in the production of a high boiling material and thus some of the available glycidyl ester is lost.

One successful method for the separation of epichlorohydrin from a glycidyl ester, such as glycidyl methacrylate, in the presence of the chlorohydrin ester

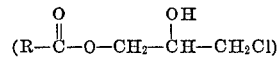

in amounts of about six weight percent and above has been to insert the admixture of the epichlorohydrin, chlorohydrin ester and glycidyl ester to the middle section of a packed column maintained at a temperature between 25° and 100° C. under a reduced pressure of from about one to about 100 millimeters of mercury while simultaneously passing an inert gas, such as nitrogen, methane, argon, etc., into the bottom of the column and out the top. The conditions in the column are such that the epichlorohydrin is vaporized and the glycidyl and chlorohydrin esters remain liquid. The epichlorohydrin is swept from the column out the top along with the inert gas entering at the bottom of the column. The glycidyl ester, such as glycidyl methacrylate, being a liquid, passes downwardly as a thin film where it is contacted by the inert gas to remove any traces of epichlorohydrin finding their way into the bottom section of the column. The liquid glycidyl ester leaving the bottom of the column enters a cold pot maintained at a temperature of about 0° C. in order to reduce any possibility of polymerization of the glycidyl methacrylate. The purity of the glycidyl ester using the above procedure is excellent, being on the order of 97 percent. If the content of chlorohydrin ester is less than about six weight percent of the reaction product, conventional distillation procedures can be employed.

The invention will be further described with reference to the following experimental work.

EXAMPLE 1

In the run for this example, 500 grams of dichloroethane, 43 grams (0.5 mole) of methacrylic acid and 33 grams of KOH dissolved in 20 grams of water were admixed and reacted for 2¾ hours at atmospheric pressure and a temperature between 24° C. and 83° C. The water was then azeotropically distilled over a period of three hours at 80° C. and the solvent was recycled, after which the potassium methacrylate was filtered and washed with two separate 100 gram portions of sieve dried epicholorohydrin.

The washed and wet potassium methacrylate salt (116.7 grams) was added to 694 grams of molecular sieve dried distilled epichlorohydrin and 1.16 grams of benzyltrimethylammonium chloride. Reaction proceeded for two hours at atmospheric pressure and a temperature of 96° to 101° C.

A yield of 91.5 mole percent of glycidyl methacrylate was obtained based on the amount which could theoretically have been obtained from the methacrylic acid. The weight percent glycidyl methacrylate in the product on a solvent and epichlorohydrin free basis was 96.5. The results are shown in Table I.

EXAMPLE 2

Example 1 was repeated except the water was not azeotropically removed prior to filtration of the salt and the amount of salt used for the second stage reaction was only 69.4 grams. The glycidyl methacrylate yield was only 61.5 percent of theoretical and the weight percent glycidyl methacrylate in the product was 96.3. The results are shown in Table I below.

A comparison of Examples 1 and 2 shows the criticality of removing the water from the first stage product before filtration of the acid salt. Apparently sufficient water must remain with the salt by physical adsorption or otherwise to considerably reduce the theoretical yield of glycidyl methacrylate. Examples 1 and 2 show that it is critical to follow the procedure of this invention to obtain both high yields and high purity of glycidyl methacrylate.

EXAMPLE 3

Example 2 was repeated except 300 grams of benzene replaced the dichloroethane and the first stage reaction was run for nine hours. In the second stage (after removal of the water by azeotropic distillation), 141.2 grams of the wet potassium methacrylate was reacted with the epichlorohydrin for four hours. The yield of glycidyl methacrylate was 9.2 mole percent of theoretical and the weight percent of glycidyl methacrylate in the product was 98.0. The results are summarized in Table I below.

A comparison of Examples 2 and 3 shows the type of solvent in stage one is not critical and excellent results can be obtained by simple filtration of the salt so long as the water is removed between stages by azeotropic distillation.

EXAMPLE 4

Example 3 was repeated except after removal of the water by azeotropic distillation 20 cc.'s of benzene solvent were removed by distillation and no filtration was performed. The yield of glycidyl methacrylate was 77.8 mole percent of theoretical with the product analyzing 92.5 percent glycidyl methacrylate. The results are summarized in Table I below.

TABLE I

| Example number | 1 | 2 | 3 | 4 | 5 |
|---|---|---|---|---|---|
| 1st Step, neutralization: | | | | | |
| Solvent | ¹DCE | ¹DCE | Benzene | Benzene | ¹DCE |
| Grams | 500 | 500 | 300 | 310 | 500 |
| Methacrylic Acid: | | | | | |
| Grams | 43 | 43 | 43 | 43 | 43 |
| Moles | 0.5 | 0.5 | 0.5 | 0.5 | 0.5 |
| Base, KOH g./cc. H₂O | 33/20 | 33/20 | 33/20 | 33/20 | 33/20 |
| Time, hours | 2¾ | ½ | 9 | 7 | 1½ |
| Temperature, C° C | 24-83 | 25-40 | 25-79 | 26-82 | 25-83 |
| Azeotropic distillation of water | Yes | No | Yes | Yes | Yes |
| Salt filtered | Yes | Yes | Yes | No | No |
| 2nd Step: | | | | | |
| Filtered undried salt from 1st Step, grams | 116.7 | 69.4 | 141.2 | | |
| Epichlorohydrin: | | | | | |
| Grams | 694 | 694 | 694 | 694 | 694 |
| Moles | 7.5 | 7.5 | 7.5 | 7.5 | 7.5 |
| Catalyst,² grams | 1.16 | 1.16 | 1.16 | 1.16 | 2.32 |
| Time, hours | 2 | 2 | 4 | 6 | 1 |
| Temperature, °C | 96-100 | 100 | 100 | 69-71 | 99-101 |
| Glycidyl methacrylate, mole percent of theoretical | 91.5 | 61.5 | 90.2 | 77.8 | 71.3 |
| Product, weight percent: | | | | | |
| Glycidyl methacrylate | 96.5 | 96.3 | 98.0 | 92.5 | 88.8 |
| 1,3-dichloropropanol | 1.7 | 2.5 | 1.1 | 2.5 | 7.4 |
| Chlorohydrin ester³ | 1.8 | 1.2 | 0.9 | 5.0 | 3.8 |

¹ DCE is 1,2-dichloroethane.
² Catalyst was benzytrimethylammonium chloride.
³ Chlorohydrin ester is:

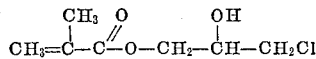

EXAMPLE 5

Example 1 was repeated except after removal of the water by azeotropic distillation, 200 grams of the dichloroethane (500 grams added initially) were removed. Epichlorohydrin was added to the remaining slurry (no filtration) and the reaction temperature was about 100° C. The yield of glycidyl methacrylate was 71.3 mole percent of theoretical and the product analyzed 88.8 weight percent glycidyl methacrylate. The results ar summarized in Table I above.

Referring to Table I, a comparison of Examples 1-5 shows that the best yields and purity of glycidyl methacrylate are obtained by following the process steps of this invention.

Resort may be had to such variations and modifications as fall within the spirit of the invention and the scope of the appended claims.

I claim:
1. A process for the preparation of a glycidyl ester selected from the group consisting of glycidyl acrylate and glycidyl methacrylate which comprises:
   contacting an unsaturated fatty acid selected from acrylic and methacrylic acids with an alkali metal base to form an alkali metal salt of said acid and water in a first reaction zone in the presence of an epoxide-free solvent which will azeotrope with water;
   removing as an azeotrope with said solvent substantially all of the water from said first reaction zone while maintaining the formed alkali metal salt in suspension in said solvent;
   separating said alkali metal salt from said solvent by filtration or centrifugation; and
   reacting said alkali metal salt in a second reaction zone with epichlorohydrin under substantially anhydrous conditions to form the desired glycidyl ester.
2. A process according to claim 1 wherein the alkali metal base is an aqueous solution of an alkali metal hydroxide.

3. A process in accordance with claim 2 wherein the solvent is represented by the general formula

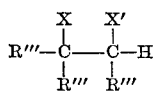

where $x$ and $x'$ can be the same or different and are selected from the group consisting of chlorine, bromine and iodine and $R'''$ is selected from the group consisting of hydrogen, alkyl radicals having from 1 to 2 carbon atoms, chlorine, bromine or iodine.

4. A process according to claim 1 wherein the epichlorohydrin is dried by contact with a zeolite to a water content of less than 10 p.p.m.

5. A process according to claim 2 wherein the unsaturated fatty acid is methacrylic acid and the solvent is selected from the group consisting of dichloroethane and benzene.

6. A process according to claim 2 wherein the alkali metal salt is contacted with the dry epichlorohydrin under substantially anhydrous conditions in said second reaction zone in the presence of a quaternary ammonium halide.

7. A process according to claim 2 wherein the alkali metal salt is separated from the first stage reaction product by filtration.

8. A process according to claim 7 wherein the solvent is selected from the group consisting of dichloroethane and benzene.

9. A process according to claim 8 wherein the unsaturated fatty acid is methacrylic acid.

10. A process according to claim 2 wherein the solution of the alkali metal hydroxide is an aqueous solution of sodium or potassium hydroxide wherein the concentration of water is between 5 and 90 weight percent and the aqueous solution of the alkali metal hydroxide is added continuously to said first reaction zone while the water in said first reaction zone is removed continuously as an azeotrope with said solvent.

11. A process according to claim 2 wherein the solution of alkali metal hydroxide is an aqueous solution of sodium or potassium hydroxide wherein the concentration of water is between 5 and 90 weight percent and the aqueous solution of the alkali metal hydroxide is added in incremental portions and the water is removed continuously as an azeotrope.

12. A process according to claim 10 wherein the solvent is dichloroethane.

13. A process according to claim 10 wherein the solvent is benzene.

14. A process according to claim 12 wherein the catalyst is tetramethylammonium bromide.

References Cited

UNITED STATES PATENTS

| | | | |
|---|---|---|---|
| 2,448,602 | 9/1948 | Kester et al. | 260—348 |
| 2,537,981 | 1/1951 | Edwards | 260—348 |

FOREIGN PATENTS

| | | | |
|---|---|---|---|
| 1,446,544 | 6/1966 | France | 260—348 |

OTHER REFERENCES

Kester et al., Jour. Organic Chemistry, vol. 8 (1943), pp. 550-6.

NORMA S. MILESTONE, Primary Examiner

U.S. Cl. X.R.

260—526 N